April 1, 1969 — M. B. HOLLANDER — 3,435,509
FRICTION WELDING
Filed July 10, 1963

INVENTOR
MILTON BERNARD HOLLANDER

United States Patent Office 3,435,509
Patented Apr. 1, 1969

3,435,509
FRICTION WELDING
Milton Bernard Hollander, Stamford, Conn., assignor, by mesne assignments, to Caterpillar Tractor Co., Peoria, Ill., a corporation of California
Filed July 10, 1963, Ser. No. 294,106
Int. Cl. B23k 27/00, 31/02, 35/24
U.S. Cl. 29—470.3        3 Claims

ABSTRACT OF THE DISCLOSURE

The process involves friction welding zirconium and zirconium alloy workpieces and stopping the relative rotation in less than ten seconds.

---

This invention relates in general to welding, and, more particularly, to the friction welding of zirconium and zirconium alloy workpieces.

Commercial grade zirconium and zirconium alloys have many useful applications in aerospace vehicles, for example in rocket motors and structural elements and nuclear reactors because of their strength retention at high temperatures and resistance to high concentrations of acids with equal resistance to strong alkalies. A typical commercial grade zirconium contains 2–2.5% hafnium, 0.15% iron, 0.03% chromium, 0.02% nickel, and minor traces of other elements.

For nuclear reactor applications, it is essential to keep the hafnium content at a minimum, and certain zirconium alloys have been developed which possess corrosion resistance to high pressure, high temperature water and have the strength required at moderately high operating temperatures. A typical alloy, marketed under the trademark Zircaloy 2, contains about 98.2% zirconium, 1.50% tin, 0.15% iron, 0.10% chromium, 0.05% nickel, and traces of other elements.

Zirconium and zirconium alloys are difficult and expensive to weld by ordinary welding techniques, and friction welding has been found to be successful and inexpensive method of welding zirconium and its alloys.

Figure 1:
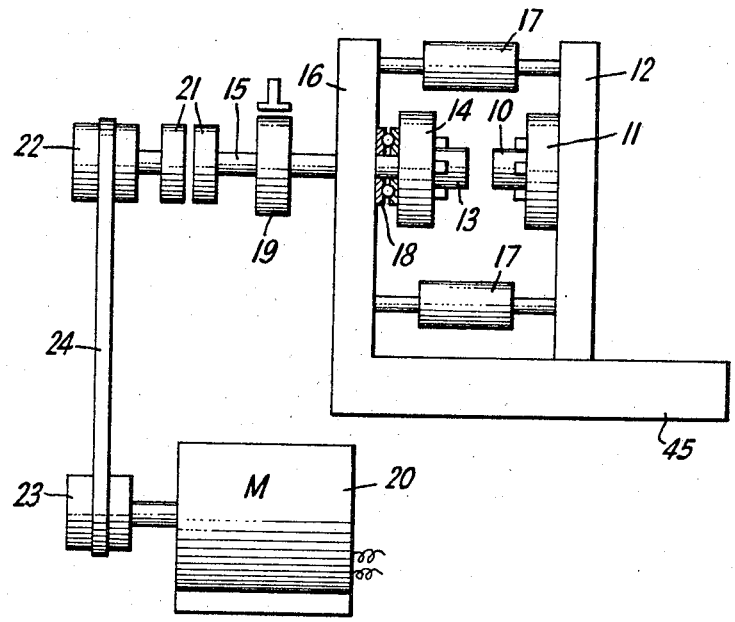
Figure 2:
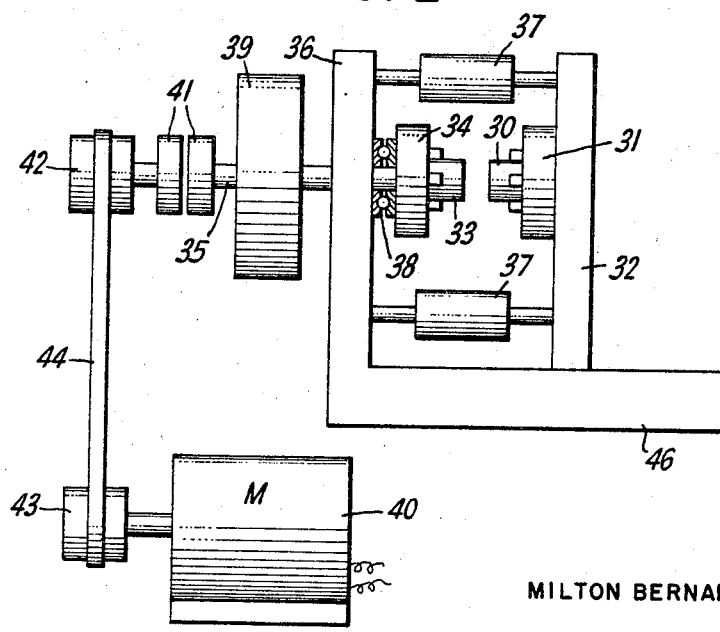

A main object of this invention is to provide a method for friction welding zirconium and zirconium alloy workpieces to each other and in combinations with each other. This and other objects, advantages and features of invention will become apparent from the following description and accompanying drawing wherein:

FIGURE 1 is a schematic drawing of a conventional friction welding apparatus; and FIGURE 2 is a schematic drawing of an inertia friction welding apparatus.

FIGURE 1 shows a conventional friction welding apparatus in which a first workpiece 10 is held in a stationary chuck 11 which is fixed to the vertical frame member 12 slidably mounted on a base 45. A second workpiece 13 is placed in the rotatably mounted chuck 14 which is fixed on the shaft 15. Shaft 15 passes through the stationary vertical frame member 16 on base 45. Hydraulic cylinders 17 are connected between the members 12 and 16 to draw them toward each other when the cylinders 17 are activated. A thrust bearing 18 takes up the axial load from the rotating chuck 14. A brake 19 is mounted on shaft 15 to rapidly stop the rotation of chuck 14. Shaft 15 is driven by motor 20 through a clutch 21 by means of the pulleys 22 and 23 and the belt 24.

FIGURE 2 shows a flywheel or inertia friction welding apparatus in which a first workpiece 30 is held in the stationary chuck 31 fixed to a vertical frame member 32 slidably mounted on a base 46. A second workpiece 33 is placed in the rotatably mounted chuck 34 which is fixed to shaft 35 passing through the stationary member and base 36. Hydraulic cylinders 37 are connected between the members 32 and 36 to draw them toward each other. A thrust bearing 38 takes the load from the rotating chuck 34. A flywheel 39 is fixed on shaft 35. Shaft 35 is driven by motor 40 through a clutch 41 by means of the pulleys 42 and 43 and the belt 44.

In inertia friction welding machines, necessary welding energy is stored in the flywheel by imparting rotation thereto, and thereafter such energy is delivered to the welding area by frictionally abutting workpieces mounted in the chucks.

To weld zirconium and zirconium alloy workpieces with the apparatus shown in FIGURES 1 and 2, about 7,000 foot pounds of energy must be delivered to the weld area for each square inch of weld area.

Zirconium and zirconium alloy workpieces 10 and 13, having a diameter of ⅜ of an inch, were successfully welded in the apparatus shown in FIGURE 1. Workpiece 13 was rotated at a speed of 4,800 r.p.m. and the cylinders 17 were activated to hold the workpieces together with a rubbing pressure of 360 pounds per square inch for one and a half seconds. Brake 19 was then applied as clutch 21 was disengaged and the cylinders 17 were further activated to force the workpieces together with a pressure of 10,000 pounds per square inch. As the weld was completed, some metal flowed plastically and upset formed between the workpieces.

If the initial rubbing pressure were reduced to 150 pounds per square inch, the rubbing pressure would have to be maintained for over five seconds to put sufficient heat energy into the weld. If the initial pressure were increased to 1,500 pounds per square inch, it would only be maintained for less than one second to put sufficient heat energy into the weld.

For best results with the apparatus shown in FIGURE 1, a relative average surface speed of over two feet per second should be maintained between the work pieces. Slower relative sliding speed may result in chatter and the galling of the workpieces rather than uniform heat generation. The forementioned values substantially hold true for larger and smaller workpieces.

Zirconium and zirconium alloy workpieces 30 and 33, which were solid bars ⅜ inch in diameter, were friction welded with the apparatus shown in FIGURE 2. About 770 foot pounds of energy were required to complete this weld for ⅜ inch diameter workpieces. This energy was obtained from a flywheel 39, which with shaft 35 and chuck 34, had an inertia of 6.05 slugs-inch square. Motor 40 was activated to rotate chuck 34 and flywheel 39 at 1,500 r.p.m. After being brought up to speed by motor 40, clutch 41 was disengaged and cylinders 37 were activated to force the workpieces 30 and 33 together with a pressure of 25,000 pounds per square inch in the weld area. The weld was completed in less than 0.5 second.

The pressure applied in making this weld may vary from 5,000 to 40,000 pounds per square inch, but a pressure over 15,000 pounds is desirable to produce the best results.

Welds can be made with the energy put into the weld varying from 3,500 to 35,000 foot pounds per square inch of weld area, but too much energy input will result in a waste of material in the production of excessive upset. Moreover, this energy should be delivered to the weld area in less than ten seconds, preferably in two seconds or less. The forementioned limits substantially hold true for friction welds from $\frac{1}{100}$ square inch in weld area to over 10 square inches in weld area. The initial average relative speed of the workpieces should preferably be greater than 2 feet per second so that energy can be delivered to the weld area in a short enough time to prevent excessive heat losses. Slower relative surface speeds may result in chatter and galling of the workpieces rather than smooth heat generation.

While this invention has been shown and described in the best forms known, it will nevertheless be understood that these are purely exemplary and that modifications may be made without departing from the spirit of the invention except as it may be more limited in the appended claims.

What is claimed is:

1. The method of friction welding zirconium and zirconium alloy workpieces comprising the steps of rotating the workpieces relative to each other, forcing the rotating workpieces together so that from 3,500 to 35,000 foot pounds of energy are released between the workpieces for each square inch of weld area, and rapidly stopping the relative rotation of the workpieces to complete the weld in less than ten seconds.

2. The method of friction welding zirconium and zirconium alloy workpieces comprising the steps of rotating the workpieces relative to each other with an average relative surface speed of over two feet per second, forcing the relatively rotating workpieces together with a force of 150 to 1,500 pounds per square inch of weld area, rapidly stopping the relative rotation of the workpieces, and forcing the workpieces together with a force of at least 5,000 pounds per square inch of weld area to complete the weld in less than ten seconds.

3. The method of friction welding zirconium and zirconium alloy workpieces comprising the steps of rotating one workpiece and a coupled flywheel to an average surface speed of over two feet per second, and forcing the workpieces together with a force from about 5,000 to about 40,000 pounds per square inch of weld area to stop the relative rotation of the workpieces in less than ten seconds to complete the weld as the decelerating workpiece and flywheel deliver from 3,500 to 35,000 foot pounds of energy per square inch of weld area.

References Cited

UNITED STATES PATENTS

| | | | |
|---|---|---|---|
| 2,946,119 | 7/1960 | Jones et al. | 29—497.5 X |
| 3,070,880 | 1/1963 | Davis et al. | 29—497.5 X |
| 3,134,169 | 5/1964 | Hollander et al. | 29—470.3 |
| 3,134,278 | 5/1964 | Hollander et al. | 29—470.3 |

JOHN F. CAMPBELL, *Primary Examiner.*

U.S. Cl. X.R.

29—504